(12) United States Patent
Kodama

(10) Patent No.: US 8,886,436 B2
(45) Date of Patent: Nov. 11, 2014

(54) DRIVING FORCE CONTROL APPARATUS AND VEHICLE CONTROL METHOD

(71) Applicant: JTEKT Corporation, Osaka (JP)

(72) Inventor: Akira Kodama, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/962,049

(22) Filed: Aug. 8, 2013

(65) Prior Publication Data

US 2014/0058643 A1 Feb. 27, 2014

(30) Foreign Application Priority Data

Aug. 21, 2012 (JP) ................................ 2012-182366

(51) Int. Cl.
*B60W 30/045* (2012.01)
*B60T 7/00* (2006.01)
*G06F 17/00* (2006.01)
*B60K 17/16* (2006.01)
*B60W 40/072* (2012.01)
*B60W 10/16* (2012.01)
*B60K 23/04* (2006.01)

(52) U.S. Cl.
CPC .............. *G06F 17/00* (2013.01); *B60W 40/072* (2013.01); *B60W 30/045* (2013.01); *B60W 2720/266* (2013.01); *B60W 2720/30* (2013.01); *B60Y 2300/82* (2013.01); *B60K 17/20* (2013.01); *B60W 10/16* (2013.01); *B60K 2023/043* (2013.01); *B60W 2510/182* (2013.01); *B60W 2520/28* (2013.01); *B60W 2720/20* (2013.01); *B60W 2720/406* (2013.01); *B60W 2710/125* (2013.01)
USPC ................................... 701/90; 701/87; 701/89

(58) Field of Classification Search
CPC ... G06F 17/00; B60W 30/045; B60W 40/072; B60W 2720/30; B60W 2720/266; B60W 2520/20; B60W 2720/20; F16H 2048/205
USPC .............................. 701/70, 82, 83, 87, 89, 90
See application file for complete search history.

(56) References Cited

U.S. PATENT DOCUMENTS

| | | | | | |
|---|---|---|---|---|---|
| 5,742,917 | A | * | 4/1998 | Matsuno | ......................... 701/69 |
| 5,947,221 | A | * | 9/1999 | Taniguchi et al. | ............. 180/197 |
| 6,094,614 | A | * | 7/2000 | Hiwatashi | ...................... 701/89 |
| 6,226,587 | B1 | * | 5/2001 | Tachihata et al. | ............... 701/72 |
| 6,598,946 | B2 | * | 7/2003 | Nagae | .......................... 303/190 |
| 8,301,321 | B2 | * | 10/2012 | Mizuno et al. | .................. 701/22 |

(Continued)

FOREIGN PATENT DOCUMENTS

JP 5-262156 10/1993
JP 2009-150484 7/2009

*Primary Examiner* — Russell Frejd
(74) *Attorney, Agent, or Firm* — Oblon, Spivak, McClelland, Maier & Neustadt, L.L.P.

(57) ABSTRACT

A driving force control apparatus includes: a turning radius estimating unit that estimates a turning radius of a four-wheel-drive vehicle; a target slip angle computing unit that computes a target slip angle at the time of turning of the four-wheel-drive vehicle, on the basis of the estimated turning radius; a target rotational speed computing unit that computes target rotational speeds of right and left rear wheels of the four-wheel-drive vehicle, on the basis of the estimated turning radius, the computed target slip angle, and a vehicle speed; and a driving force control unit that controls driving forces that are transmitted to the right and left rear wheels such that actual rotational speeds of the right and left rear wheels approach the computed target rotational speeds.

6 Claims, 3 Drawing Sheets

(56) References Cited

U.S. PATENT DOCUMENTS 8,306,697 B2 * 11/2012 Lu et al. .......................... 701/38
8,321,088 B2 * 11/2012 Brown et al. ................... 701/38
8,348,353 B2 * 1/2013 Yamada et al. ............... 303/143
2010/0241304 A1 * 9/2010 Maeda ........................... 701/29

* cited by examiner

DRIVING FORCE CONTROL APPARATUS AND VEHICLE CONTROL METHOD

INCORPORATION BY REFERENCE

The disclosure of Japanese Patent Application No. 2012-182366 filed on Aug. 21, 2012 including the specification, drawings and abstract is incorporated herein by reference in its entirety.

BACKGROUND OF THE INVENTION

1. Field of the Invention

The invention relates to a driving force control apparatus for a vehicle and a vehicle control method.

2. Description of Related Art

Conventionally, there has been known a driving force control apparatus that is installed in, for example, a four-wheel-drive vehicle, and that is able to variably control distribution of driving force to right and left wheels. Refer to, for example, Japanese Patent Application Publication No. 2009-150484 (JP 2009-150484 A) and Japanese Patent Application Publication No. 5-262156 (JP 5-262156 A).

A driving force control apparatus described in JP 2009-150484 A includes a gear input member connected to a propeller shaft, a gear output member meshed with the gear input member, and a pair of clutch output adjustment mechanisms respectively arranged between the gear output member and right and left rear wheels. By adjusting transmission torque with the use of the clutch output adjustment mechanisms, it is possible to control distribution of driving force to the right and left rear wheels.

A driving force control apparatus described in JP 5-262156 A includes hydraulically-driven right wheel-side clutches and hydraulically-driven left wheel-side clutches, and sets the hydraulic pressures that are supplied to the right wheel-side clutches and the left wheel-side clutches by executing feedback control such that an actual yaw rate approaches a target yaw rate computed on the basis of a steering angle and a vehicle speed.

In a vehicle including the driving force control apparatus described in either one of the documents described above, the turning performance can be improved by transmitting, to the outer wheels during turning, a driving force higher than a driving force that is transmitted to the inner wheels during turning.

However, the actual yaw rate changes as the orientation of the vehicle changes. Therefore, in a control for causing the actual yaw rate to approach the target yaw rate, for example, even when the vehicle understeers and the turning radius thereof deviates from a target turning radius, the actual yaw rate does not coincide with the target yaw rate if the orientation of the vehicle is changed. Therefore, a control for causing the turning radius of the vehicle to approach the target turning radius cannot be executed. As described above, with the control for causing the actual yaw rate to approach the target yaw rate, the turning performance cannot be sufficiently improved in some cases.

SUMMARY OF THE INVENTION

One object of the invention is to provide a driving force control apparatus and a vehicle control method for solving the problem described above.

An aspect of the invention relates to a driving force control apparatus, including: a turning radius estimating unit that estimates a turning radius of a vehicle; a target slip angle computing unit that computes a target slip angle at the time of turning of the vehicle, on the basis of the estimated turning radius; a target rotational speed computing unit that computes target rotational speeds of right and left wheels on at least one of a front wheel side and a rear wheel side, on the basis of the estimated turning radius, the computed target slip angle, and a vehicle speed; and a driving force control unit that controls driving forces for the right and left wheels such that actual rotational speeds of the right and left wheels approach the computed target rotational speeds.

Another aspect of the invention relates to a vehicle control method. According to the vehicle control method, a turning radius of a vehicle is estimated, a target slip angle at the time of turning of the vehicle is computed on the basis of the estimated turning radius. A target rotational speeds of right and left wheels on at least one of a front wheel side and a rear wheel side are computed on the basis of the estimated turning radius, the computed target slip angle, and a vehicle speed. And the driving forces for the right and left wheels are controlled such that actual rotational speeds of the right and left wheels approach the computed target rotational speeds.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
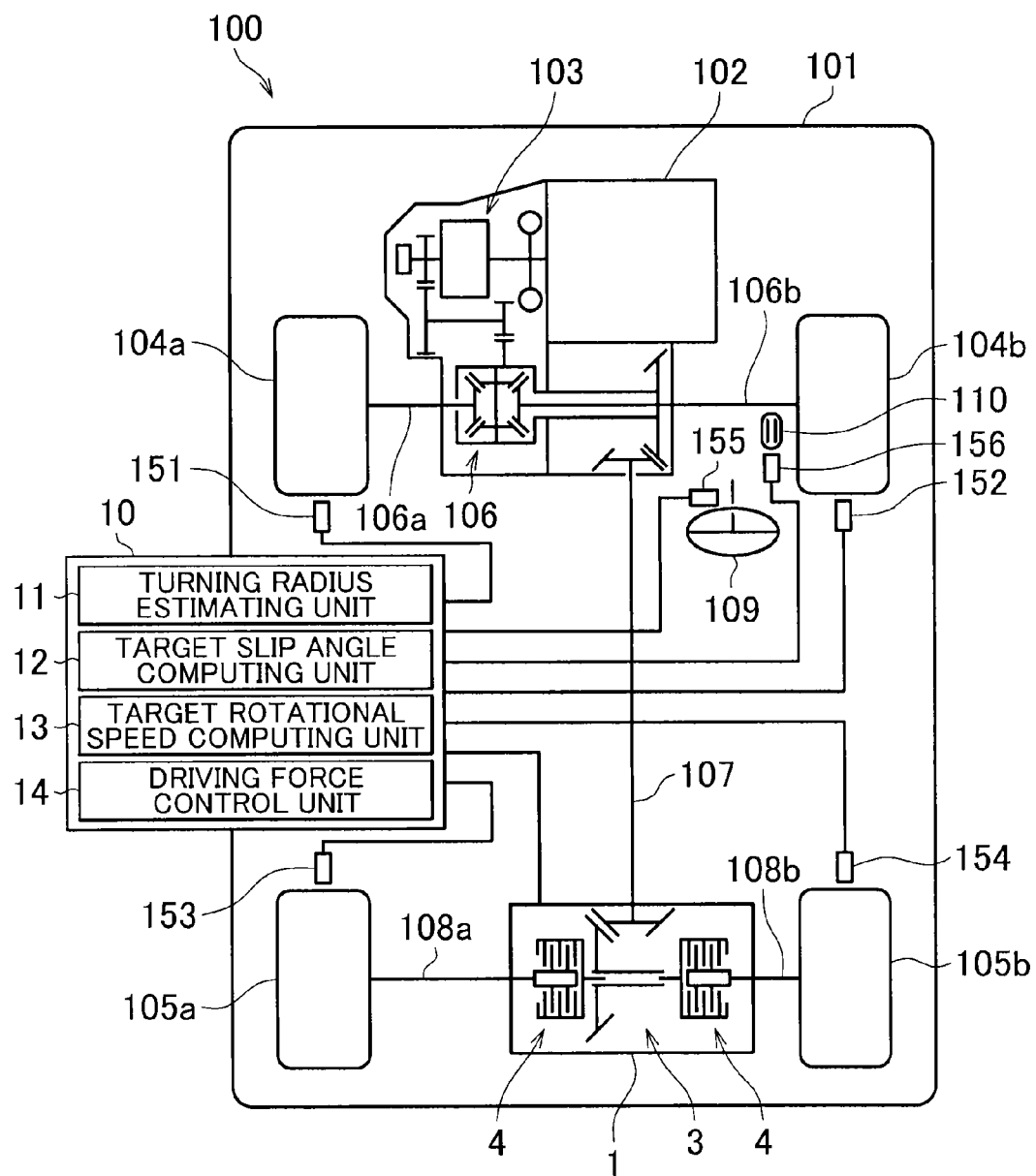
FIG. 1 is a schematic configuration diagram illustrating a four-wheel-drive vehicle according to an embodiment of the invention.

Hereinafter, embodiments of the invention will be described with reference to the accompanying drawings. As illustrated in FIG. 1, a four-wheel-drive vehicle 100 includes a vehicle body 101, an engine 102, which serves as a drive source that generates torque for causing the four-wheel-drive vehicle 100 to travel, a transmission 103, right and left front wheels 104b, 104a, which serve as a pair of right and left main drive wheels to which driving force is always transmitted from the engine 102, and right and left rear wheels 105b, 105a, which serve as a pair of right and left auxiliary drive wheels to which the driving force is transmitted from the engine 102 depending on a travelling state.

The four-wheel-drive vehicle 100 includes a front differential 106, a propeller shaft 107, and a driving force transmission apparatus 1, which constitute a driving force transmission system. The driving force, which is output from the engine 102 and of which the speed is changed by the transmission 103, is always transmitted to the right and left front wheels 104b, 104a via the front differential 106 and a pair of drive shafts 106b, 106a. The right and left front wheels 104b, 104a function as steered wheels that are turned with respect to the vehicle body 101 in response to an operation of a steering wheel 109 performed by a driver.

The driving force, which is output from the engine 102 and of which the speed is changed by the transmission 103, is transmitted to the right and left rear wheels 105b, 105a via the propeller shaft 107, the driving force transmission apparatus 1, and a pair of drive shafts 108b, 108a. The driving force transmission apparatus 1 is able to adjust the driving force that is transmitted to the right rear wheel 105b and the driving force that is transmitted to the left rear wheel 105a independently from each other. The configuration of the driving force transmission apparatus 1 will be described later.

The four-wheel-drive vehicle 100 includes a driving force control apparatus 10 that controls the driving force for the right rear wheel 105b and the driving force for the left rear wheel 105a independently from each other, with the use of the driving force transmission apparatus 1. The driving force control apparatus 10 includes a turning radius estimating unit 11, a target slip angle computing unit 12, a target rotational speed computing unit 13, and a driving force control unit 14. The driving force control apparatus 10 will be described later in detail.

Rotational speed sensors 152, 151, 154, 153 that respectively detect rotational speeds of the right and left front wheels 104b, 104a and the right and left rear wheels 105b, 105a are connected to the driving force control apparatus 10. The rotational speed sensors 151 to 154 are each formed of, for example, a Hall IC that is arranged so as to face a magnetic ring that has a plurality of magnetic poles and that rotates together with a corresponding one of the right and left front wheels 104b, 104a, the right and left rear wheels 105b, 105a. The rotational speed sensors 15a to 15d each output a pulse signal with a period that corresponds to the rotational speed of a corresponding one of the right and left front wheels 104b, 104a and the right and left rear wheels 105b, 105a. On the basis of the pulse signals, the driving force control apparatus 10 is able to detect the rotational speeds of the right and left front wheels 104b, 104a and the right and left rear wheels 105b, 105a.

A steering angle sensor 155 that detects a steering angle, which is a rotation angle of the steering wheel 109 from a neutral position, is connected to the driving force control apparatus 10. On the basis of a signal from the steering angle sensor 155, the driving force control apparatus 10 is able to detect the steering angle of the steering wheel 109.

An accelerator operation amount sensor 156 that detects a depressed amount of an accelerator pedal 110 is connected to the driving force control apparatus 10. On the basis of a signal from the accelerator operation amount sensor 156, the driving force control apparatus 10 is able to detect the accelerator operation amount corresponding to the depressed amount of the accelerator pedal 110.

Figure 2:
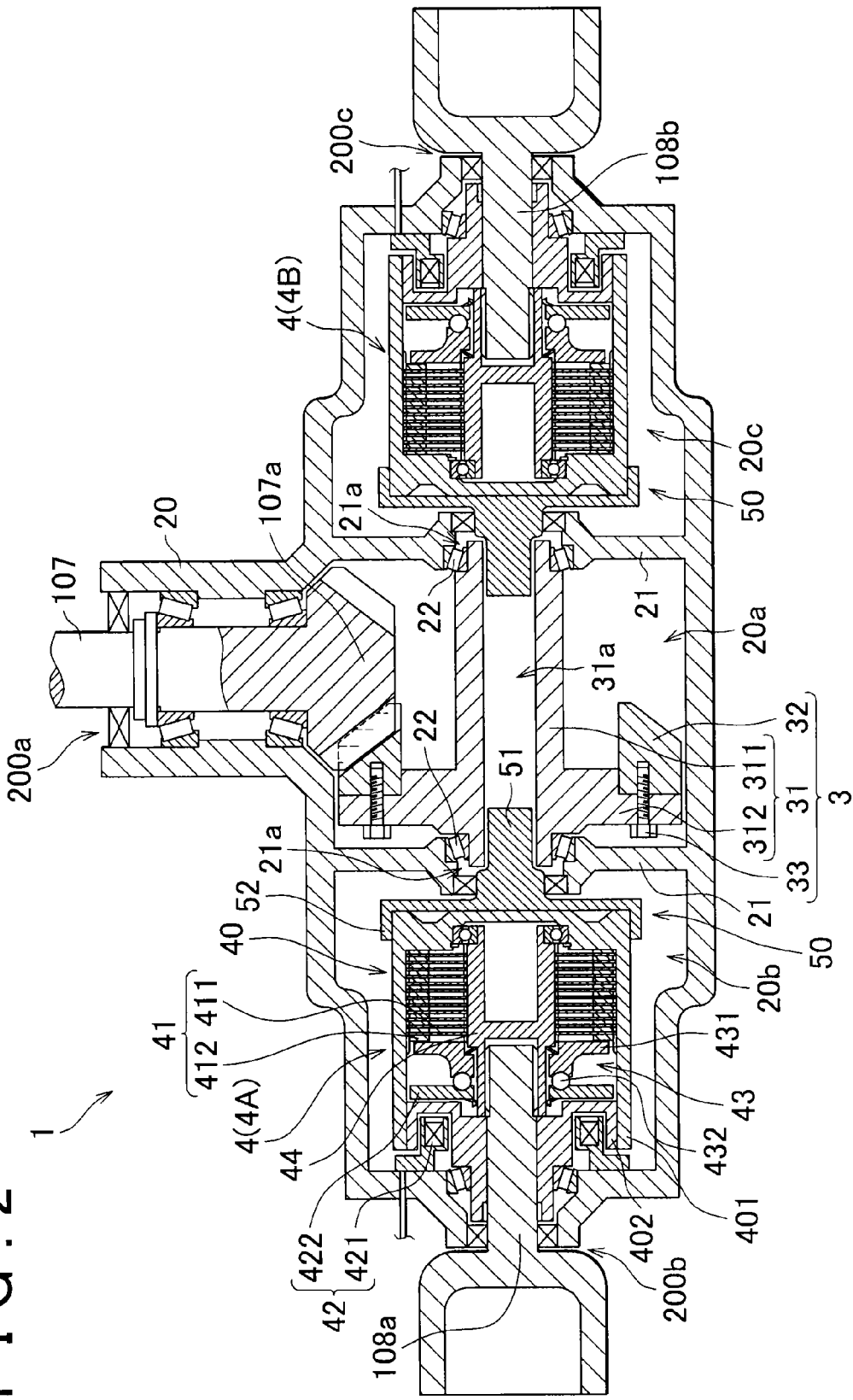
FIG. 2 is a sectional view illustrating an example of the configuration of a driving force transmission apparatus.

FIG. 2 is a sectional view illustrating an example of the configuration of the driving force transmission apparatus 1.

The driving force transmission apparatus 1 includes: a case member 20 having therein a first housing space 20a, a second housing space 20b, and a third housing space 20c; an input rotary member 3 housed in the first housing space 20a of the case member 20; and a pair of torque couplings 4 housed respectively in the second and the third housing spaces 20b, 20c, which are arranged on the opposite sides of the first housing space 20a.

The torque coupling 4 housed in the second housing space 20b and the torque coupling 4 housed in the third housing space 20c have the same configuration. However, if it is necessary to distinguish the torque couplings 4 from each other in the following description, the torque coupling 4 housed in the second housing space 20b will be referred to as a first torque coupling 4A and the torque coupling 4 housed in the third housing space 20c will be referred to as a second torque coupling 4B.

In the case member 20, a pair of partitions 21 is provided. One of the partitions 21 separates the first housing space 20a and the second housing space 20b from each other, and the other one of the partitions 21 separates the first housing space 20a and the third housing space 20c from each other. Each of the partitions 21 has a through-hole 21a. The through-hole 21a of one of the partitions 21 provides communication between the first housing space 20a and the second housing space 20b, and the through-hole 21a of the other one of the partitions 21 provides communication between the first housing space 20a and the third housing space 20c.

The input rotary member 3 has a first member 31 rotatably supported by the case member 20, and a second member 32 formed of an annular ring gear. The first member 31 and the second member 32 are connected to each other with a plurality of bolts 33. The first member 31 has a cylindrical portion 311 with a through-hole 31a formed at the center thereof, and a flange 312 that projects outward from the outer periphery of the cylindrical portion 311. The cylindrical portion 311 and the flange 312 are formed as a single-piece member. The second member 32 is fixed to a distal end portion of the flange 312 and meshes with a gear portion 107a formed at one end of the propeller shaft 107, which passes through a first opening 200a of the case member 20. The first member 31 is rotatably supported by a pair of bearings 22 disposed between the first member 31 and inner faces of the through-holes 21a.

Each of the torque couplings 4 includes a multi-disc clutch 41, an electromagnetic clutch 42, a cam mechanism 43, an inner shaft 44, and a housing 40 that houses these components.

The housing 40 is formed of a first housing member 401 and a second housing member 402 that are coupled to each other so as to be non-rotatable relative to each other. The first housing member 401 has a bottomed cylindrical shape, and the second housing member 402 is arranged so as to close an opening-side end portion of the first housing member 401.

The multiple-disc clutch 41 is arranged between the first housing member 401 of the housing 40 and the cylindrical inner shaft 44. The multiple-disc clutch 41 includes inner clutch plates 411 and outer clutch plates 412. The inner clutch plates 411 are spline-engaged with the outer periphery of the inner shaft 44 so as to be non-rotatable relative to the inner shaft 44. The outer clutch plates 412 are spline-engaged with the inner periphery of the first housing member 401 so as to be non-rotatable relative to the first housing member 401.

The electromagnetic clutch 42 includes an annular coil 421 and an armature cam 422, and is arranged on the rotational axis of the housing 40. In the electromagnetic clutch 42, the armature cam 422 is moved toward the coil 421 by an electromagnetic force generated by the coil 421. Thus, the armature cam 422 is brought into friction sliding with the second housing member 402.

The cam mechanism 43 includes the armature cam 422, a main cam 431 and spherical cam followers 432. The armature cam 422 serves as a cam member. The main cam 431 is arranged next to the armature cam 422 along the rotational axis of the housing 40. The cam followers 432 are interposed between the main cam 431 and the armature cam 422. In the cam mechanism 43, the armature cam 422 receives a rotational force from the housing 40 upon energization of the coil 421, and converts the rotational force into a pressing force that is used as a clutch force of the multiple-disc clutch 41.

As the amount of electricity that is supplied to the coil 421 is increased, a force of friction between the armature cam 422 and the second housing member 402 is increased, so that the main cam 431 presses the multiple-disc clutch 41 more strongly. That is, the torque coupling 4 is able to variably control the pressing force of the multiple-disc clutch 41 on the basis of the amount of electricity that is supplied to the coil 421, thereby adjusting the amount of torque that is transmitted between the housing 40 and the inner shaft 44.

One end of the left rear wheel-side drive shaft 108*a*, which is passed through a second opening 200*b* of the case member 20, is connected by spline-fitting to the inner shaft 44 of the first torque coupling 4A so as to be non-rotatable relative to the inner shaft 44. One end of the right rear wheel-side drive shaft 108*b*, which is passed through a third opening 200*c* of the case member 20, is connected by spline-fitting to the inner shaft 44 of the second torque coupling 4B so as to be non-rotatable relative to the inner shaft 44.

The housings 40 of the first torque coupling 4A and the second torque coupling 4B and the cylindrical portion 311 of the first member 31 of the input rotary member 3 are connected to each other by a pair of connecting members 50 so as to be non-rotatable relative to each other. Each of the connecting members 50 has a columnar boss portion 51 and a disc-shaped flange 52, which are formed as a single-piece member. The boss portion 51 is spline-fitted to the inner face of the through-hole 31*a* of the first member 31 so as to be non-rotatable relative to the first member 31, and the flange 52 is spline-fitted to the housing 40 so as to be non-rotatable relative to the housing 40. The boss portion 51 is passed through the through-hole 21*a* of the partition 21.

Excitation current is supplied from the driving force control apparatus 10 to the coil 421 of the torque coupling 4. The driving force control apparatus 10 is able to control the driving force that is transmitted from the input rotary member 3 to the left rear wheel 105*a* by increasing or decreasing the current that is supplied to the coil 421 of the first torque coupling 4A. The driving force control apparatus 10 is able to control the driving force that is transmitted from the input rotary member 3 to the right rear wheel 105*b* by increasing or decreasing the current that is supplied to the coil 421 of the second torque coupling 4B.

In the four-wheel-drive vehicle 100, the gear ratio of each component is set such that the rotational speed of the right and left rear wheels 105*b*, 105*a* is higher than the rotational speed of the right and left front wheels 104*b*, 104*a* during straight-ahead travelling in which the inner clutch plates 411 and the outer clutch plates 412 of the multi-disc clutch 41 of each torque coupling 4 are completely frictionally engaged with each other without rotating relative to each other.

The driving force control apparatus 10 includes, for example, a central processing unit (CPU) and a memory element. When the CPU executes processes according to programs stored in the memory element, the driving force control apparatus 10 functions as the turning radius estimating unit 11, the target slip angle computing unit 12, the target rotational speed computing unit 13, and the driving force control unit 14.

The turning radius estimating unit 11 estimates a turning radius of the four-wheel-drive vehicle 100. The turning radius is an ideal turning radius intended by the driver, and is, for example, a turning radius that conforms to the curvature of a curve of a road on which the four-wheel-drive vehicle 100 is travelling. The turning radius can be estimated on the basis of, for example, the steering angle of the steering wheel 109 detected by the steering angle sensor 155. Alternatively, the turning radius may be estimated on the basis of, for example, an image captured by an in-vehicle camera, or the turning radius may be estimated on the basis of map information and the information on a present location obtained from a car navigation system or the like.

The target slip angle computing unit 12 computes a target slip angle at the time of turning of the four-wheel-drive vehicle 100, on the basis of the turning radius estimated by the turning radius estimating unit 11. The slip angle in this case refers to an angle formed by the central axis that extends along the longitudinal direction of the four-wheel-drive vehicle 100 (the direction orthogonal to the vehicle width direction), and the actual travelling direction of the four-wheel-drive vehicle 100. The target slip angle refers to a suitable slip angle at which the four-wheel-drive vehicle 100 is able to travel along the arc of a turning radius estimated by the turning radius estimating unit 11.

Figure 3:
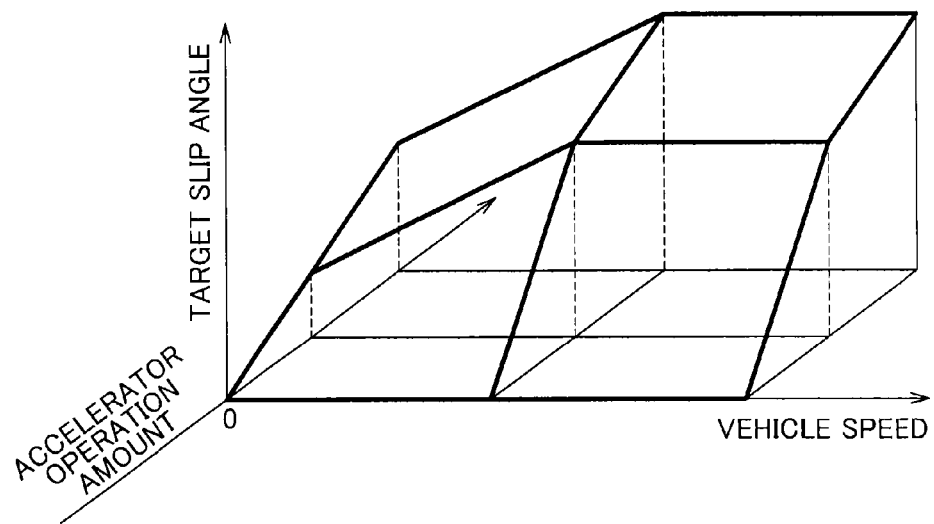
FIG. 3 is a graph illustrating an example of a map indicating the relationship among a vehicle speed, an operation amount of an accelerator, and a target slip angle.

The target slip angle can be obtained by computation on the basis of, for example, a vehicle speed and an accelerator operation amount. FIG. 3 is an example of a map illustrating the relationship among a vehicle speed, an accelerator operation amount, and a target slip angle. The target slip angle computing unit 12 refers to the map, and sets the target slip angle to a larger value as the vehicle speed is higher and as the accelerator operation amount is larger. In other words, if the vehicle speed is high or the accelerator operation amount is large and therefore the wheels are likely to slip, the four-wheel-drive vehicle 100 travels while being oriented further inward (oriented toward the center of turn) with respect to the actual traveling direction, that is, the four-wheel-drive vehicle 100 is countersteered.

The target slip angle computing unit 12 stores a plurality of maps each indicating the relationship among a vehicle speed, an accelerator operation amount, and a target slip angle, and refers to one of the maps according to the turning radius estimated by the turning radius estimating unit 11 to compute a target slip angle.

The target slip angle computing unit 12 may set the target slip angle by executing computation based on a friction coefficient of a road surface. In this case, the lower the friction coefficient of the road surface is, the larger the target slip angle is. Alternatively, the target slip angle obtained on the basis of the vehicle speed and the accelerator operation amount may be corrected according to the friction coefficient of the road surface. In this case, the correction is made such that the lower the friction coefficient of the road surface is, the larger the target slip angle is. Further, the target slip angle may be set or corrected on the basis of a centrifugal force that acts on the four-wheel-drive vehicle 100.

The target rotational speed computing unit 13 computes the target rotational speeds of the right and left rear wheels 105*b*, 105*a* on the basis of the turning radius estimated by the turning radius estimating unit 11, the target slip angle computed by the target slip angle computing unit 12, and the vehicle speed. The target rotational speeds in this case mean the rotational speeds of wheels in the case where the four-wheel-drive vehicle 100 travels at the turning radius estimated by the turning radius estimating unit 11 and at the target slip angle computed by the target slip angle computing unit 12, at the actual vehicle speed of the four-wheel-drive vehicle 100 determined on the basis of the rotational speeds of the right and left front wheels 104*b*, 104*a* and the right and left rear wheels 105*b*, 105*a*.

Figure 4:
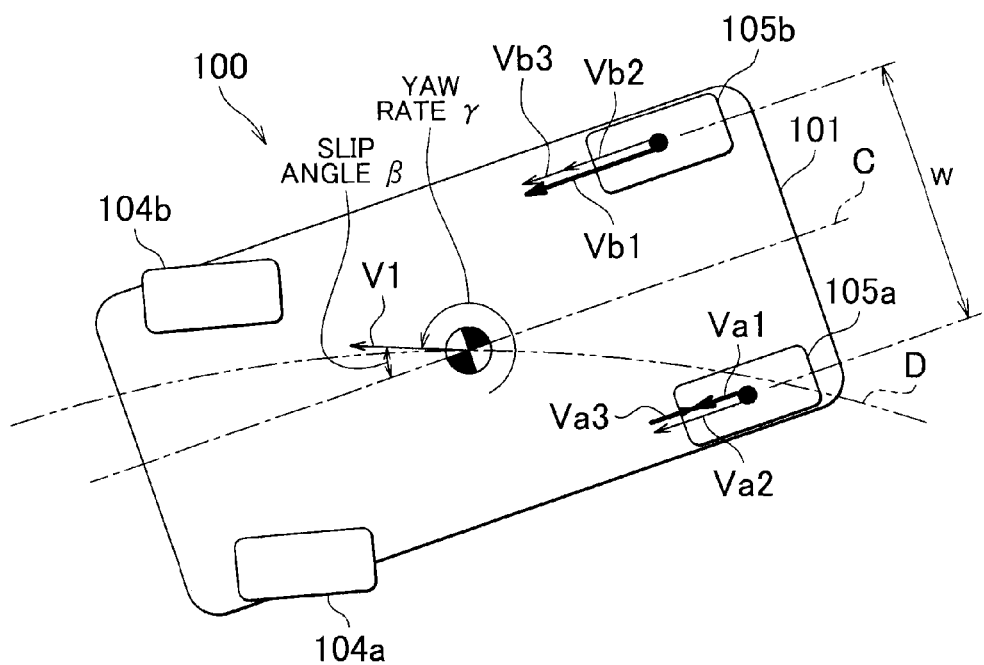
FIG. 4 is an explanatory diagram illustrating an example of computation of target rotational speeds of right and left rear wheels.

FIG. 4 is an explanatory diagram illustrating an example of computation of target rotational speeds of right and left rear wheels 105*b*, 105*a*. In FIG. 4, a dashed line indicated by C denotes the central axis of the four-wheel-drive vehicle 100, and a two-dot chain line indicated by D denotes an arc-shaped trajectory of the turning radius estimated by the turning radius estimating unit 11 (an ideal travelling direction of the four-wheel-drive vehicle 100). A tread width, which is the center-to-center distance between the right and left rear wheels 105b, 105a, is denoted by W, and it is assumed that the right rear wheel 105b is on the outer side of a turn, that is, the left rear wheel 105a is on the inner side of the turn.

In FIG. 4, the travelling direction of the four-wheel-drive vehicle 100 is denoted by a vector V1, the rolling direction of the left rear wheel 105a is denoted by a vector Va1, and the rolling direction of the right rear wheel 105b is denoted by a vector Vb1. The length of the vector Va1 represents the rotational speed of the left rear wheel 105a, and the length of the vector Vb1 represents the rotational speed of the right rear wheel 105b. The angle formed by the vector V1 and the central axis C is a slip angle $\beta$. If the turning radius estimated by the turning radius estimating unit 11 is denoted by R, the vehicle speed is denoted by V, and the yaw rate is denoted by $\gamma$, the yaw rate $\gamma$ is determined according to a relational expression, $\gamma = V/R$.

As illustrated in FIG. 4, if a vector, parallel to the vector Va1 and having a vector length denoted by $V \cdot \cos \beta$, is referred to as a vector Va2, and a vector, parallel to the vector Va1 and having a vector length denoted by $\gamma \cdot W/2$, is referred to as a vector Va3, a vector length La of the vector Va1 can be determined by a computing equation, $La = V \cdot \cos \beta - \gamma \cdot W/2$. Further, based on the relational expression $\gamma = V/R$, the vector length La can be determined by a computing equation, $La = V \cdot (\cos \beta - W/2R)$.

Further, as illustrated in FIG. 4, if a vector, parallel to the vector Vb1 and having a vector length denoted by $V \cdot \cos \beta$, is referred to as a vector Vb2, and a vector, parallel to the vector Vb1 and having a vector length denoted by $\gamma \cdot W/2$ is referred to as a vector Vb3, a vector length Lb of the vector Vb1 can be determined by a computing equation, $Lb = V \cdot \cos \beta + \gamma \cdot W/2$. Further, based on the relational expression $\gamma = V/R$, the vector length Lb can be determined by a computing equation, $Lb = V \cdot (\cos \beta + W/2R)$.

The target rotational speed computing unit 13 is able to convert the vector lengths La, Lb into the target rotational speeds of the right and left rear wheels 105b, 105a, by taking the diameters of the right and left rear wheels 105b, 105a into account.

The driving force control unit 14 controls the driving force that is transmitted to the right rear wheel 105b and the driving force that is transmitted to the left rear wheel 105a such that the actual rotational speeds of the right rear wheel 105b and the left rear wheel 105a approach the target rotational speeds computed by the target rotational speed computing unit 13.

More specifically, if the actual rotational speed of the left rear wheel 105a detected by a rotational speed sensor 153 is lower than the target rotational speed of the left rear wheel 105a, the current that is supplied to the coil 421 of the first torque coupling 4A is increased to increase the rotational speed of the left rear wheel 105a. If the actual rotational speed of the left rear wheel 105a is higher than the target rotational speed of the left rear wheel 105a, the current that is supplied to the coil 421 of the first torque coupling 4A is decreased to reduce the rotational speed of the left rear wheel 105a. In the case of the right rear wheel 105b as in the case of the left rear wheel 105a, the current that is supplied to the coil 421 of the second torque coupling 4B is increased or decreased to control the driving force that is transmitted to the right rear wheel 105b such that the actual rotational speed of the right rear wheel 105b approaches the target rotational speed of the right rear wheel 105b.

During braking in which the torque is transmitted from the left rear wheel 105a and the right rear wheel 105b to the input rotary member 3, the driving force control unit 14 inverts the magnitude relationship between the amount of torque that is transmitted between the input rotary member 3 and the left rear wheel 105a by the first torque coupling 4A and the amount of torque that is transmitted between the input rotary member 3 and the right rear wheel 105b. Thus, even in a state where the depressed amount of the accelerator pedal 110 is reduced and the engine braking occurs, it is possible to execute a control such that the actual rotational speeds of the right rear wheel 105b and the left rear wheel 105a approach the target rotational speeds.

According to the embodiment described above, the driving force that is transmitted to the right rear wheel 105b and the driving force that is transmitted to the left rear wheel 105a are controlled such that the four-wheel-drive vehicle 100 travels along the trajectory of the estimated turning radius. Thus, the four-wheel-drive vehicle 100 is allowed to travel along the target turning radius. That is, it is possible to achieve stable turning performance.

The driving force control apparatus for a four-wheel-drive vehicle according to the invention has been described with reference to the embodiment. However, the invention is not limited to the embodiment, and may be implemented in various other embodiments within the scope of the invention. For example, the configuration of the driving force transmission apparatus 1 is not limited to the one illustrated in FIG. 2, and various other configurations may be employed. In the above-described embodiment, the four-wheel-drive vehicle 100 includes the engine 102 that serves as a single drive source. Alternatively, however, the four-wheel-drive vehicle 100 may include a plurality of drive sources. More specifically, electric motors that serve as drive sources may be provided for the right and left front wheels 104b, 104a and the right and left rear wheels 105b, 105a, respectively. Further, in the above-described embodiment, the driving force control apparatus 10 controls the driving forces for the right and left rear wheels 105b, 105a. Alternatively, the driving force control apparatus 10 may control the driving forces for the right and left front wheels 104b, 104a, or may control the driving forces for the right and left front wheels 104b, 104a and the right and left rear wheels 105b, 105a. In other words, the configuration of a vehicle drive system is not particularly limited, and the invention may be applicable to, for example, a two-wheel-drive vehicle.

What is claimed is:

1. A driving force control apparatus, comprising:
   a turning radius estimating unit that estimates a target turning radius of a vehicle;
   a target slip angle computing unit that computes a target slip angle at the time of turning of the vehicle, on the basis of the estimated target turning radius;
   a target rotational speed computing unit that computes target rotational speeds of right and left wheels on at least one of a front wheel side and a rear wheel side, on the basis of the estimated target turning radius, the computed target slip angle, and a vehicle speed; and
   a driving force control unit that controls driving forces for the right and left wheels such that actual rotational speeds of the right and left wheels approach the computed target rotational speeds.

2. The driving force control apparatus according to claim 1, wherein
   the driving force control unit controls driving force for a right wheel and driving force for a left wheel independently from each other, the right wheel and the left wheel being on one side among the front wheel side and the rear wheel side, and transmission of driving force from the drive source to the one side being selectively allowed and interrupted.

3. The driving force control apparatus according to claim 2, wherein:

the driving force control unit adjusts an amount of torque that is transmitted between an input rotary member, to which the driving force is transmitted from the drive source, and the right wheel, and an amount of torque that is transmitted between the input rotary member and the left wheel, to control the driving force for the right wheel and the driving force for the left wheel; and during braking in which torque is transmitted to the input rotary member from the right wheel and the left wheel, the driving force control unit inverts a magnitude relationship between the amount of torque that is transmitted between the input rotary member and the right wheel, and the amount of torque that is transmitted between the input rotary member and the left wheel.

4. A driving force control apparatus, comprising:

a turning radius estimating unit that estimates a turning radius of a vehicle;

a target slip angle computing unit that computes a target slip angle at the time of turning of the vehicle, on the basis of the estimated turning radius;

a target rotational speed computing unit that computes target rotational speeds of right and left wheels on at least one of a front wheel side and a rear wheel side, on the basis of the estimated turning radius, the computed target slip angle, and a vehicle speed; and a driving force control unit that controls driving forces for the right and left wheels such that actual rotational speeds of the right and left wheels approach the computed target rotational speeds, wherein:

the driving force control unit adjusts an amount of torque that is transmitted between an input rotary member, to which the driving force is transmitted from the drive source, and the right wheel, and an amount of torque that is transmitted between the input rotary member and the left wheel, to control the driving force for the right wheel and the driving force for the left wheel; and during braking in which torque is transmitted to the input rotary member from the right wheel and the left wheel, the driving force control unit inverts a magnitude relationship between the amount of torque that is transmitted between the input rotary member and the right wheel, and the amount of torque that is transmitted between the input rotary member and the left wheel.

5. A vehicle control method, comprising the steps of:

estimating a target turning radius of a vehicle;

computing a target slip angle at the time of turning of the vehicle, on the basis of the estimated target turning radius;

computing target rotational speeds of right and left wheels on at least one of a front wheel side and a rear wheel side, on the basis of the estimated target turning radius, the computed target slip angle, and a vehicle speed; and controlling driving forces for the right and left wheels such that actual rotational speeds of the right and left wheels approach the computed target rotational speeds.

6. A vehicle control method, comprising the steps of:

estimating a turning radius of a vehicle;

computing a target slip angle at the time of turning of the vehicle, on the basis of the estimated turning radius;

computing target rotational speeds of right and left wheels on at least one of a front wheel side and a rear wheel side, on the basis of the estimated turning radius, the computed target slip angle, and a vehicle speed; and controlling driving forces for the right and left wheels such that actual rotational speeds of the right and left wheels approach the computed target rotational speeds, further including the further steps of:

adjusting an amount of torque that is transmitted from an input rotary member to the right wheel, and an amount of torque that is transmitted from the input rotary member to the left wheel, to control the driving force for the right wheel and the driving force for the left wheel; and during braking in which torque is transmitted to the input rotary member from the right wheel and the left wheel, inverting a magnitude relationship between the amount of torque that is transmitted between the input rotary member and the right wheel, and the amount of torque that is transmitted between the input rotary member and the left wheel.

* * * * *